(12) United States Patent
Benisty

(10) Patent No.: US 10,901,733 B1
(45) Date of Patent: Jan. 26, 2021

(54) OPEN CHANNEL VECTOR COMMAND EXECUTION

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 34 days.

(21) Appl. No.: 16/459,183

(22) Filed: Jul. 1, 2019

(51) Int. Cl.
*G06F 9/06* (2006.01)
*G06F 9/30* (2018.01)
*G06F 13/16* (2006.01)

(52) U.S. Cl.
CPC ........ *G06F 9/30036* (2013.01); *G06F 9/3004* (2013.01); *G06F 13/1668* (2013.01)

(58) Field of Classification Search
CPC combination set(s) only.
See application file for complete search history.

(56) References Cited

U.S. PATENT DOCUMENTS

| | | | |
|---|---|---|---|
| 8,407,407 B1 | 3/2013 | Adler et al. | |
| 9,075,708 B1* | 7/2015 | Kang | G06F 12/0246 |
| 9,645,739 B2 | 5/2017 | Veal et al. | |
| 9,652,376 B2 | 5/2017 | Kuzmin et al. | |
| 9,720,860 B2 | 8/2017 | Rose et al. | |
| 9,904,609 B2 | 2/2018 | Miomo | |
| 10,282,132 B2 | 5/2019 | A et al. | |
| 10,445,013 B2 | 10/2019 | Lei et al. | |
| 10,761,775 B2 | 9/2020 | Kachare et al. | |
| 2007/0195367 A1 | 8/2007 | Kumagai et al. | |
| 2017/0308329 A1 | 10/2017 | A et al. | |
| 2018/0088841 A1 | 3/2018 | Ma et al. | |
| 2018/0225065 A1 | 8/2018 | Singh et al. | |
| 2018/0260148 A1 | 9/2018 | Klein | |
| 2019/0079702 A1 | 3/2019 | Yeon et al. | |
| 2019/0095123 A1 | 3/2019 | Lin | |
| 2019/0166201 A1 | 5/2019 | Choi et al. | |
| 2019/0324692 A1* | 10/2019 | Kuwamura | G06F 3/061 |

OTHER PUBLICATIONS

Sooyun Lee et al.; "Adaptive Priority Boosting Technique of the Host Level FTL in Open-Channel SSDs", Proceeding of the Korean Intstitute of Information Scientists and Engineers Conference. Dec. 2018; https://www.dbpia.co.kr/pdfView.do?nodeId=NODE07613929&mark=0&useDate=&bookmarkCnt=0&ipRange=N&language=ko_KR (p. 1311-1313).

International Search Report and Written Opinion issued in corresponding International Patent Application No. PCT/US2020/023177, dated Jul. 7, 2020 (7 pages).

Bjorling, Matias et al.; "LightNVM: The Linux Open-Channel SSD Subsystem"; Usenix, the Advanced Computing Systems Association; 15th USENIX Conference on File and Storage Technologies (FAST '17); https://www.usenix.org/conference/fast17/technical-sessions/presentation/bjorling; Santa Clara, CA, Feb. 27-Mar. 2, 2017 (17 pages).

* cited by examiner

*Primary Examiner* — Cheng Yuan Tseng
(74) *Attorney, Agent, or Firm* — Patterson & Sheridan, LLP; Steven H. Versteeg

(57) ABSTRACT

A method and apparatus that provide a solid state drive controller configured to analyze input/output commands from a host computing device to determine whether the commands include a vector or non-vector command, and is configured to generate a plurality of non-vector commands based on the physical addresses contained in the vector command.

20 Claims, 4 Drawing Sheets

OPEN CHANNEL VECTOR COMMAND EXECUTION

BACKGROUND OF THE DISCLOSURE

Field of the Disclosure

Embodiments of the present disclosure generally relate to systems and methods for executing vector commands on a memory device.

Description of the Related Art

A solid state drive (SSD) storage device is a data storage device commonly composed of a controller and an SSD memory (e.g., a non-volatile NAND flash). In all SSD storage devices, the controller sits between one or more host computing systems and the SSD memory. The SSD storage device interacts with a host using a flash-translation layer (FTL).

Recently, a new class of SSDs have been developed known as open-channel SSDs. Open-channel SSDs differ from a traditional SSD in that they expose the internal mapping of the SSD memory structure to the host, allowing the host to perform data placement and data input/output (I/O) scheduling using the physical addresses instead of the traditional logical addresses. Accordingly, the open-channel SSD has the ability to leave certain aspects of the FTL for the host to handle. As the host takes on additional responsibilities that were once relegated to the storage device, additional commands, such as vector commands may be used to enhance the functionality of the SSDs.

Thus, as the demand for digital storage solutions continue to increase, what is needed are new ways to support the additional vector commands not only to meet the growing demand, but to advance and enhance the user experience.

SUMMARY OF THE DISCLOSURE

The present disclosure generally relates to a method and apparatus that provide a solid state drive controller that analyzes input/output commands from a host computing device to determine whether the commands include a vector or non-vector command, and is configured to generate a plurality of non-vector commands based on the physical addresses contained in the vector command.

In one embodiment, the disclosure describes a device, comprising a memory and a controller communicatively coupled to the memory, wherein the controller is configured to identify a set of physical addresses in a vector command fetched from a host computing device, wherein each physical address of the set of physical addresses corresponds to a location in the memory. In some embodiments, the controller is also configured to generate a set of non-vector commands, wherein each non-vector command in the set of non-vector commands corresponds to one of each physical address in the set of physical addresses. In some embodiments, the controller is also configured to execute the set of non-vector commands. In some embodiments, the controller is configured to generate a message to the host computing device indicating completion of the vector command in response to the execution of the set of non-vector commands.

In another embodiment, the disclosure describes device, comprising a memory and a controller communicatively coupled to the memory, wherein the controller is configured to receive an indication that the memory has executed a non-vector command, wherein the non-vector command is one of a plurality of non-vector commands corresponding to a vector command received from a host computing device. In some embodiments, the controller is also configured to determine whether the memory has executed all of the plurality of non-vector commands corresponding to the vector command. In some embodiments, the controller is also configured to generate a completion message indicating execution of the vector command if the memory has executed each of the plurality of non-vector commands. In some embodiments, the controller is also configured to transmit the completion message to the host computing device.

In another embodiment, the disclosure describes an apparatus. In one example, the apparatus includes means for receiving a vector command from a host device, wherein the vector command comprises a set of physical addresses. In another example, the apparatus include a means for generating a set of non-vector commands, wherein each non-vector command in the set of non-vector commands corresponds to one of each physical address in the set of physical addresses, and wherein each non-vector command in the set of non-vector commands is configured to be executed by a means for storing digital data. In another example, the apparatus includes a means for generating a message to the host computing device indicating completion of the vector command in response to the execution of the set of non-vector commands by the means for storing digital data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to a method and apparatus that provide a solid state drive controller that analyzes input/output (I/O) commands from a host computing device to determine whether the commands include a vector or non-vector command, and generates a plurality of non-vector commands based on the physical addresses contained in the vector command.

Figure 1:
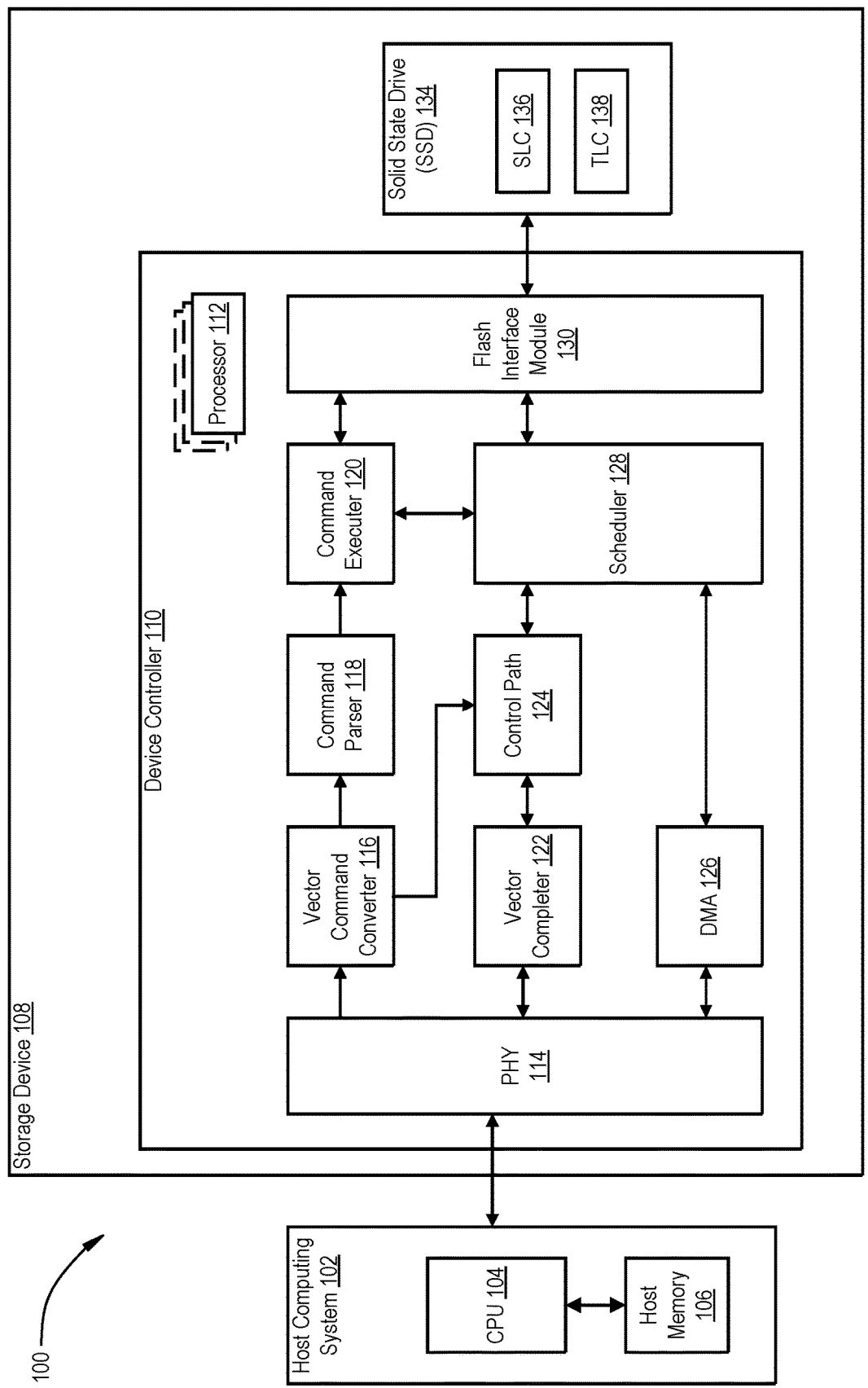
FIG. 1 is a block diagram of a memory device communicatively coupled to a host computer system, in accordance with certain aspects of the disclosure.

FIG. 1 is a schematic illustration of one embodiment of a system 100 including a host computing system 102 communicatively coupled to a storage device 108. Storage device 108 includes a controller 110 and a non-volatile memory (NVM), such as a solid state drive (SSD) 134 made up of one or more one or more dies or planes of flash memory cells (e.g., single level cells (SLC 136), multi-level cells (MLC), tri level cells (TLC 138), etc.). Host 102 interfaces with the storage device 108 to issue I/O commands for memory operations, including: read, write, copy, and reset (e.g., erase) at the SSD 134.

Storage device 108 may be an internal storage drive, such as a notebook hard drive or a desktop hard drive. Storage device 108 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. Storage device 108 may take the form of an embedded mass storage device, such as an eSD/eMMC embedded flash drive, embedded in host 108. Storage device 108 may also be any other type of internal storage device, removable storage device, embedded storage device, external storage device, or network storage device.

Host 102 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, host 102 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware.

In some configurations, host 102 includes a central processing unit (CPU) 104 connected to a host memory 106, such as DRAM or other main memories. An application program may be stored to host memory 106 for execution by CPU 104. For example, host memory 106 may include a computer-readable medium that stores computer-readable program code (e.g., software or firmware) executable by processor 104. The host 102 can be configured with hardware and/or firmware to perform the various functions described below and shown in the flow diagrams.

Storage device 108 includes physical (PHY) interface components 114, for ingress of communications from host 102 to storage device 108 and egress of communications from storage device 108 to host 102. A link between storage device 108 and host 102 may include any appropriate link, such as a peripheral component interconnect express (PCIe) link. PCIe link supports full duplex communication between storage device 108 and host 102 via dedicated unidirectional serial point-to-point connections, or "lanes." PCIe link can include one to thirty-two lanes, depending on the number of available PHYs 114 between storage device 108 and host 102.

Communications between storage device 108 and host 102 may operate under a communication protocol, such as a PCIe serial communication protocol or other suitable communication protocols. Other suitable communication protocols include ethernet, serial attached SCSI (SAS), serial AT attachment (SATA), any protocol related to remote direct memory access (RDMA) such as Infiniband, iWARP, or RDMA over Converged Ethernet (RoCE), and other suitable serial communication protocols. Storage device 108 may also be connected to host 102 through a switch or a bridge.

SSD 134 of storage device 108 may include a non-volatile memory space configured for long-term storage of information after power on/off cycles. In some examples, SSD 134 may consist of one of more dies or planes of NAND flash memory, electrically programmable read only memories (EPROM), electrically erasable programmable read only memories (EEPROM), and other solid-state memories.

Storage device 108 includes a controller 110 which manages operations of storage device 108, such as writes to and reads from SSD 134. Controller 110 includes one or more processors 112, which may be multi-core processors. Processor 112 handles the components of storage device 108 through firmware code.

Controller 110 may operate under NVM Express (NVMe) protocol, but other protocols are applicable. NVMe protocol is a communications interface/protocol developed for SSDs to operate over a host and storage device linked over the PCIe interface (e.g., PHY 114). NVMe protocol provides a command submission queue and command completion queue for access of data stored in storage device 108 by host 102. Storage device 108 may fetch, receive, or read host 102 commands from a command submission queue of host queues stored in host memory 106.

Controller 110 executes computer-readable program code (e.g., software and/or firmware) executable instructions (herein referred to as "instructions"). The instructions may be executed by various components of controller 110, such as processor 112, logic gates, switches, application specific integrated circuits (ASICs), programmable logic controllers, embedded microcontrollers, and other components of controller 110.

The instructions are stored in a non-transitory computer readable storage medium. In some embodiments, the instructions are stored in a non-transitory computer readable storage medium of storage device 108, such as in a read-only memory or in SSD 134. Instructions stored in storage device 108 may be executed without added input or directions from host 102. In other embodiments, the instructions are transmitted from host 102. The controller 110 is configured with hardware and instructions to perform the various functions described herein and shown in the figures.

Storage device 102 may also include other components, such as flash interface module 130, a direct memory access (DMA) module 126, a scheduler 128, a command executor 120, and a control path 124. Flash interface module 130 interacts with SSD 134 for operations associated with various I/O commands for controlling and accessing the open-channel SSD (e.g., SSD 134). DMA module 126 is configured to control actual data transfers between host 102 and storage device 108. Scheduler 128 is configured to activate and schedule the various components illustrated in FIG. 1. For example, scheduler 128 controls the data transfer while activating the control path 124 for fetching physical page regions (PRPs), posting completion requests and interrupts, and activating the DMAs for the actual data transfer between host 102 and storage device 108. Control path 124 is configured to transfer control information between host 102 and storage device 108, and provide completion requests to a vector completer 122. Command parser 118 is configured to parse and queue commands received from a vector command converter 116, and communicate the commands to command executer 120. The command executer 120 is configured to arbitrate and execute the commands received from the command parser 118.

The vector command converter 116 and the vector completer 122 may relate to one or more of a hardware, firmware, and/or software implementation on the device controller 110 for supporting vector-type commands from host 102. In some configurations, the vector command converter 116 monitors I/O commands received from the host 102. The vector command converter 116 may determine whether the I/O command is a vector command or a non-vector command. For example, the vector command converter 116 may identify the I/O command as a vector command based on whether the I/O command includes an extra field that contains a list of scatter-gather logical block addresses. If the I/O command is not a vector command (e.g., does not contain the list of scatter-gather logical block addresses), the non-vector I/O command is communicated to the command parser for execution. Otherwise, the vector command converter 116 fetches the metadata of the vector command via the control path 124, and temporarily stops fetching new commands from the host 102.

In some configurations, the vector command converter 116 generates a plurality of non-vector I/O commands based on a single vector command. In some cases, the entire set of the plurality of non-vector I/O commands are logically equivalent to the single vector command. In some examples, the plurality of non-vector I/O commands are generated by converting pointers contained in the vector command to physical addresses, and generating a non-vector I/O command for each physical address. The vector command converter 116 may then queue the non-vector I/O commands in the command parser 118 for execution. Once the non-vector I/O commands are queued, the device controller 110 may resume fetching new I/O commands from host 102. As used herein, a vector command may be a list or a set of commands generated by host 102. A plurality of physical addresses may be allocated to each vector command to specify a plurality of memory locations in the SSD. In some configurations, the vector command may include a pointer to metadata stored on the host memory 106. In this configuration, the metadata contains a physical address list for accessing SSD 134.

In some configurations, the vector completer 122 gathers all completion messages associated with the plurality of non-vector I/O commands generated by the vector command converter 116. Initially, the gathered completion messages will not be provided to the host 102. Instead, once all the completion messages associated with the plurality of non-vector I/O commands are received, the vector completer 122 generates a vector command completion message based on the content of all the completion requests associated with the plurality of non-vector I/O commands. That is, the vector command completion message is an indication that the vector command received from the host 102 and converted to the plurality of non-vector I/O commands has been completed. The vector completer 122 then provides the vector command completion message to the host 102.

In some configurations, device controller 110 is responsible for handling I/O commands (including vector commands) received from host 102, ensuring data integrity and efficient storage, and managing the SSD 134. To perform these tasks, controller 110 runs a flash translation layer (FTL) firmware. FTL tasks may be executed by one or more processors 112 utilizing one or more of the aforementioned components. FTL may also performs numerous other functions, including: error code correction (i.e., use of redundant data, or parity data to recover a message with errors); garbage collection (i.e., identifying/invalidating stale data in SSD 134 memory blocks for deletion to free space for future writes); scheduling (i.e., controlling the order in which I/O commands from host 102 are executed); over-provisioning (i.e., memory reserved for maintaining write speed); and wear-leveling (i.e., spreading writes across the blocks of the SSD 134 as evenly as possible to ensure that all blocks of the device wear at a roughly similar rate).

However, in some configurations, host 102 may be responsible for some or all of the FTL tasks. For example, SSD 134 may include a physically addressable SSD, such as an open-channel SSD. In such a configuration, the open-channel SSD may expose the internal parallel organization of the SSD 134 to the host 102 so that the SSD 134 can be directly managed by host 102.

Figure 2:
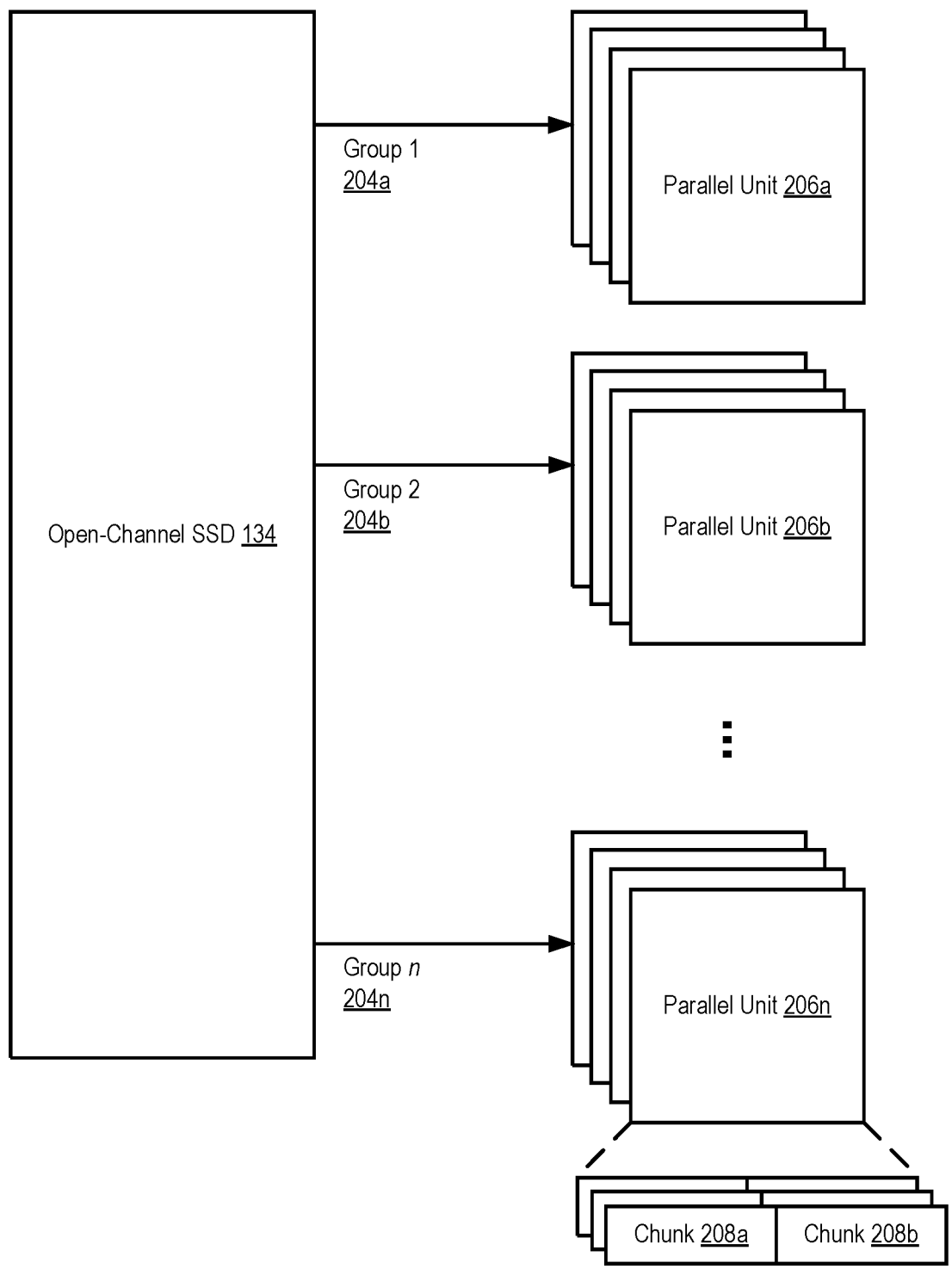
FIG. 2 is a block diagram illustrating a logical representation of the internal parallel organization of an open-channel solid state drive (SSD), in accordance with certain aspects of the disclosure.

FIG. 2 is a block diagram illustrating a logical representation of the internal parallel organization of an open-channel SSD 202. The logical structure of the SSD 202 is divided by one or more groups 204a-204n, parallel units 206a-206n (e.g., NAND dies or planes), and chunks 208a-208b containing one or more logical blocks (not shown). Within the parallel units 206a-206n, there is a set of chunks representing a linear range of logical blocks. In some examples, a group 204a-204n may relate to a shared bus or physical channel used to communicate I/O commands to the parallel units 206a-206n, while the parallel unit 206a-206n may relate to one or more NAND flash memory devices on the shared bus. In some examples, the chunk 208a-208b is the smallest addressable unit for reading and writing, and a logical block is the smallest erasable unit.

In some configurations, the host 102 is responsible for aspects of the FTL. Accordingly, the open-channel SSD 202 may not receive a logical address based instruction from the host 102. Instead, host 102 may directly manage physical addresses of the open-channel SSD 202 in which data are stored. In some configurations, responsibilities of host 102 include data placement and I/O scheduling. For example, the host 102 may control data mapping using physical addressing, as well as generating mapping tables and other metadata.

Accordingly, the host 102 may issue I/O commands using vector-type commands that include an extra field configured to communicate a list of scatter-gather logical block addresses. Using the vector command, host 102 is able to access separate parallel units 206a-206n at the same time using a single I/O command. However, not all storage devices may be capable of supporting vector commands. For example, non-vector I/O commands from the host 102 are generally directed to a single NAND plane for each command, while the vector command can be directed to several NAND planes in parallel in a single I/O command. According to certain aspects of the disclosure, minimal hardware, software, and/or firmware changes can be applied to the storage device to configure the device controller 110 to support vector commands issued by the host 102.

Figure 3:
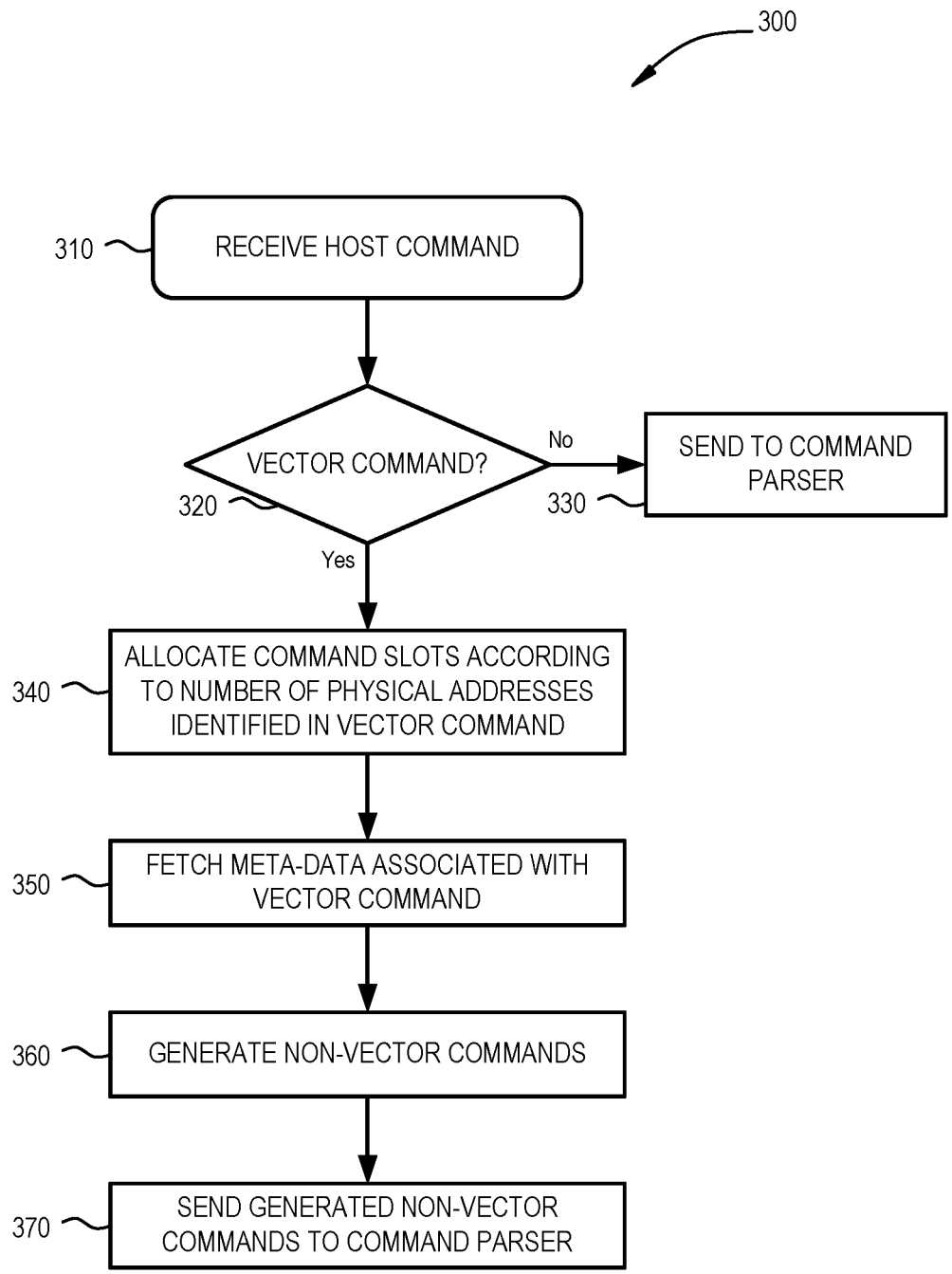
FIG. 3 is a flow diagram illustrating an exemplary process for executing a vector command in accordance with certain aspects of the disclosure.

FIG. 3 is a flow diagram illustrating an exemplary process 300 for receiving and executing a vector command. The process 300 may be performed, for example, by a storage device (e.g., such as storage device 108 of FIG. 1). The process 300 may be implemented as software and/or firmware components stored on a memory that are executed and run on one or more processors (e.g., processor 112 of FIG. 1). Further, the transmission and reception of signals by the storage device 108 in exemplary process 300 may be enabled, for example, by one or more PHY interfaces (e.g., PHY 114 of FIG. 1).

At block 310, the storage device 108 receives a host I/O command. For example, a device controller 110 of the storage device 108 may receive the I/O command from a host 102 via the PHY 114 interface. In some configurations, the device controller 110 includes a command register containing a number (e.g., 64, 256, 512, etc.) of 1-bit slots. The device controller 110 can regulate the receipt of I/O commands from the host 102 based on whether the command register has any available slots (e.g., slots with a binary "0").

For example, the device controller 110 may set (e.g., with a binary "1") one of the command register slots for each command received from the host 102. Accordingly, if a bit is set, the corresponding slot has an I/O command received by the device controller 110 associated with it. If the bit is available, then the slot is empty and the device controller 110 is available for a new command.

In some configurations, a processor 112 may determine whether the command register contains any available slots before the device controller 110 fetches a new I/O command. For example, the processor 112 may utilize a bitmap vector stored in the device controller 110 to determine whether a command register slot is set before proceeding to fetch an I/O command from the host 102.

Accordingly, in some configurations, the device controller 110 determines whether the command register contains at least one available slot prior to fetching an I/O command from the host 102. Once the device controller 110 determines that a slot is available, the device controller 110 fetches the I/O command and proceeds to set the available slot. If the device controller 110 determines that there are no slots available, then the device controller 110 may disable fetching of I/O commands from the host 102 until a slot becomes available.

At block 320, the device controller 110 determines whether the fetched I/O command is a vector command. If the I/O command is not a vector command, then the process 300 moves on to block 330, and the device controller 110 is queued to the command parser 118 for execution of the command. If the I/O command is a vector command, then the process 300 moves on to block 340, where the device controller 110 determines the number of physical addresses contained in the vector command and sets a number of command slots equal to or less than the number of physical addresses. For example, if there are fewer available slots in the command register than physical addresses contained in the vector command, then the vector command converter 116 will proceed to generate only a number of non-vector I/O commands from the vector command equal to the number of slots, while the remaining non-vector I/O commands will be generated when one or more slots become available (e.g., after completion of a command corresponding to one of the slots).

For example, if the SSD device can hold up to 64 I/O commands from the host 102, then 64 commands slots are implemented in the command register of the device controller 110. If all of the 64 command slots are set, then the device controller 110 will stop fetching host commands until the completion of at least one outstanding I/O command, whereby the corresponding slot is cleared.

Similarly, if the storage device 108 is in an idle state, and there are no outstanding commands in the device controller 110, then the command register is 0. If the device controller 110 fetches 16 non-vector I/O commands from host 102, then bits 0 to 15 in the command register are set to indicate that command slots 0 to 15 are occupied. However, if the device controller 110 fetches a single vector command that contains 32 physical addresses, then 32 non-vector I/O commands must be generated. At this point, device controller 110 sets 32 command slots (e.g. slots 16 to 47 in the command register). In some configurations, the device controller 110 will stop fetching new I/O commands until the non-vector commands are generated and queued for execution. In other configurations, the device controller 110 may continue fetching up to 16 more commands, based on command slot availability.

For example, if the device controller 110 fetches 15 new non-vector commands and 1 vector command from the host 102, and the vector command contains 21 physical addresses, then the device controller sets the remaining 16 command slots (i.e., fifteen slots are set for the non-vector commands, and 1 slot is set for the vector command), and generates only one non-vector command corresponding to one of the physical addresses in the vector command. The device controller then stops fetching I/O commands from the host 102 and waits until a slot becomes available before generating additional non-vector commands corresponding to the remaining 20 physical addresses in the vector command.

Accordingly, the device controller 110 may stop fetching additional I/O commands from host 102 until a slot in the command register has been set for each physical address contained in the vector command, and the command register contains an available slot. In other configurations, if the command register does not contain an available slot, the device controller 110 may continue to fetch new commands from host 102, but it will take into account the number of I/O commands that are going to be generated. For example, the device controller 110 may continue to fetch new commands, identify the number of physical addresses in each command, and queue the vector command converter 116 to generate the plurality of I/O commands based on the vector command as slots become available.

At block 350, the device controller 110 fetches the metadata of the vector command from the host 102. In some configurations, the metadata contains information required for the generation of the plurality of I/O commands. For example, the metadata may include a list of physical addresses that correspond to a pointer included in the vector command. In another example, the metadata may include a pointer represented by a physical region page (PRP) or a scatter gather list (SGL), according to NVMe standard. Storage device fetches the pointers and may manipulate them in order to build the pointers for each non-vector command.

At block 360, the vector command converter 116 generates a plurality of non-vector I/O commands based on the vector command fetched from the host 102. In some configurations, the vector command converter 116 generates each of the non-vector I/O commands by attaching one of the physical addresses of the vector command to each non-vector command. Accordingly, the plurality of non-vector I/O commands are equivalent to the original vector command.

In some configurations, the plurality of non-vector I/O commands are generated in an order according to metadata provided by the host 102. For example, the device controller 110 may fetch the metadata from the host 102. In some examples, the metadata contains a physical address list. Accordingly, the non-vector I/O commands may be generated sequentially in the order of the addresses on the list. In other configurations, the non-vector I/O commands are generated according to the structure of the storage device and/or resource availability. For example, the vector command converter 116 may generate the non-vector I/O commands in order of priority, where a physical address associated with an available parallel unit gets higher priority than a physical address associated with a busy parallel unit. In this configuration, quality of service and efficiency of the storage device 108 is improved.

At block 370, the vector command converter 116 sends the plurality of non-vector commands to the command parser 118 to be queued for execution.

Figure 4:
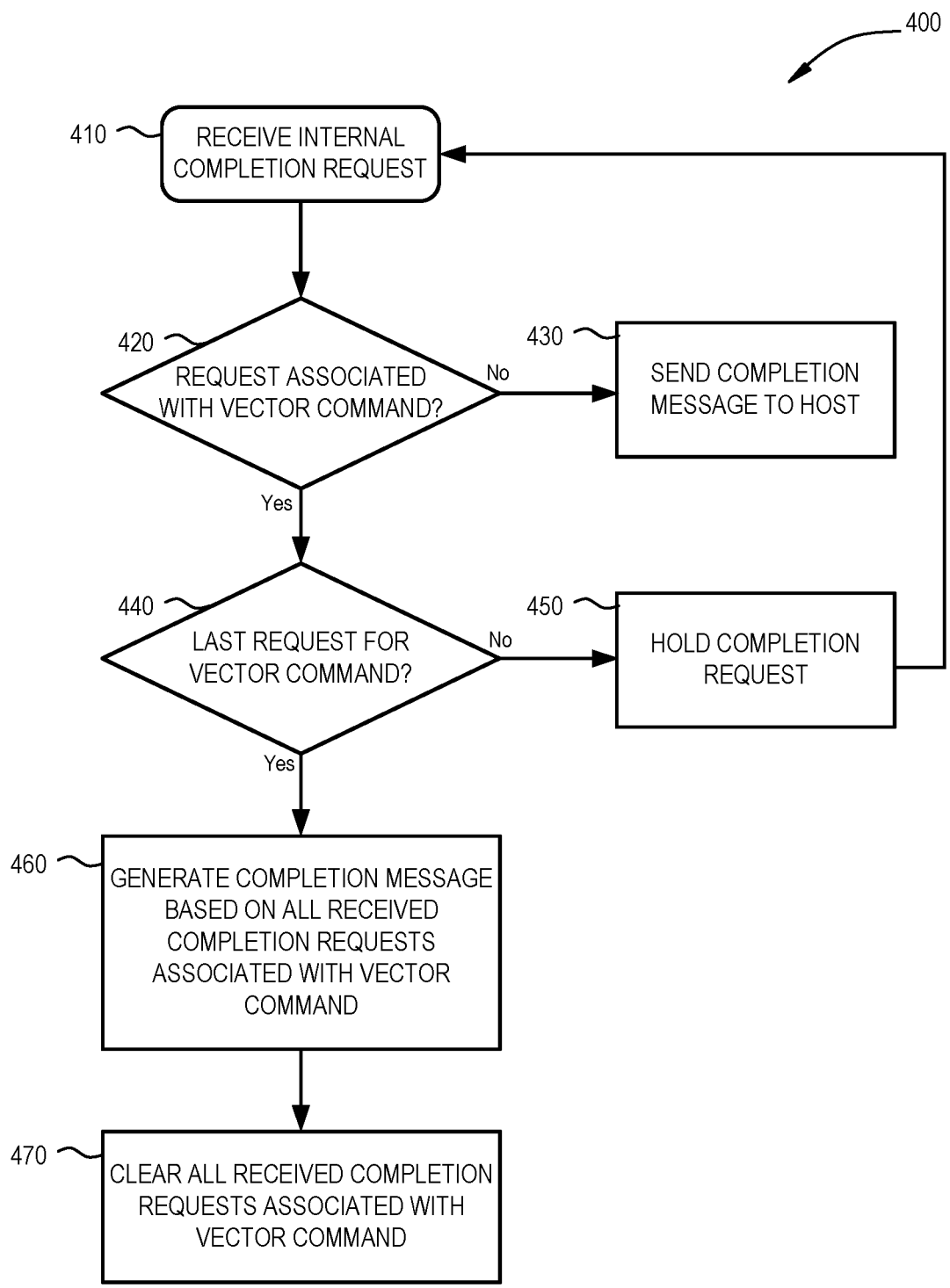
FIG. 4 is a flow diagram illustrating an exemplary process for generating a vector command completion message in accordance with certain aspects of the disclosure.

FIG. 4 is a flow diagram illustrating an exemplary process 400 for generating and sending a command completion. The process 400 may be performed, for example, by a storage device (e.g., such as storage device 108 of FIG. 1). The process 400 may be implemented as software and/or firmware components stored on a memory that are executed and run on one or more processors (e.g., processor 112 of FIG. 1). Further, the transmission and reception of signals by the storage device 108 in exemplary process 400 may be enabled, for example, by one or more PHY interfaces (e.g., PHY 114 of FIG. 1).

At block 410, the vector completer 122 receives a completion request. In some configurations, the completion request is generated by the flash interface module 130 and communicated to the vector completer 122 via control path 124.

At step 420, the vector completer 122 identifies whether the completion request corresponds to a standalone non-vector I/O command or one of a plurality of non-vector commands that originated from a vector command. If the completion request corresponds to the standalone non-vector I/O command, then the process 400 moves on to block 430 where the vector completer 122 generates a completion message and provides the completion message to the host 102.

If, at step 420, the vector completer 122 determines that the completion request corresponds to one of the plurality of non-vector commands that originated from a vector command, then the process 400 moves on to step 440 where the vector completer 122 determines whether the received completion request is the last request for the vector command. For example, the vector completer 122 may be configured to gather all the completion requests associated with a particular vector command. If the received completion request is not the last request (i.e., the vector completer 122 has not gathered all the completion requests associated with each physical address of the vector command), then the process 400 moves on to block 450, where the vector completer 122 holds the received completion request and waits until it receives the last completion request for the vector command.

If, at step 440, the vector completer 122 determines that the received completion request is the last request for the vector command, then the process 400 moves on to block 460 where the vector completer 122 generates a vector command completion message based on all the received completion requests associated with the vector command.

At block 470, the vector completer 122 clears all received completion requests associated with the vector command.

In summary, the disclosure relates generally to systems, methods, and apparatus for receiving vector-type I/O commands from host 102, and executing the vector commands on an open-channel SSD (e.g., SSD 134) with minimal changes to a storage device 108. In particular, certain aspects of the disclosure relate to methods and apparatus for supporting vector commands such that the vector commands are processed transparently to the host 102 and several components of the storage device 108. For example, the vector command converter 116 may be configured to generate a plurality of non-vector I/O commands from a single vector command, and pass the plurality of non-vector I/O commands onto other components of the storage device 108 for execution. Moreover, the vector completer 122 may generate a vector command completion message based on the completion of the plurality of non-vector I/O commands, and pass the completion message to the host 102. Here, the host 102 may not be provided with an indication of how the vector command was processed.

In some examples, the generation, by the vector command converter 116, of the plurality of non-vector I/O commands from a single vector command provides the device controller 110 with the capacity to intelligently schedule the plurality of non-vector I/O commands to improve efficiency of the storage device 108. In one example, the vector command converter 116 may generate the non-vector I/O commands in order of priority, where a physical address associated with an available parallel unit gets higher priority than a physical address associated with a busy parallel unit. In this configuration, quality of service and efficiency of the storage device 108 is improved.

In one non-limiting embodiment, a device is disclosed, wherein the device includes a memory and a controller communicatively coupled to the memory. In some configurations, the controller is configured to identify a set of physical addresses in a vector command fetched from a host computing device, wherein each physical address of the set of physical addresses corresponds to a location in the memory. In some configurations, the controller is configured to generate a set of non-vector commands, wherein each non-vector command in the set of non-vector commands corresponds to one of each physical address in the set of physical addresses. In some configurations, the controller is configured to execute the set of non-vector commands. In some configurations, the controller is configured to generate a message to the host computing device indicating completion of the vector command in response to the execution of the set of non-vector commands.

In one non-limiting embodiment, the controller is further configured to fetch a command from the host computing device, and determine the fetched command is a vector command, wherein the determination is based on whether the fetched command comprises a field configured to communicate a list of scatter-gather logical block addresses.

In one non-limiting embodiment, the controller is further configured to fetch meta-data from the host computing device, wherein the meta-data comprises a list of physical addresses.

In one non-limiting embodiment, the vector command comprises a pointer configured to identify the set of physical addresses in the list of physical addresses in the meta-data.

In one non-limiting embodiment, the set of physical addresses comprises two or more physical addresses.

In one non-limiting embodiment, the controller includes a command register containing a plurality of 1-bit slots, wherein the controller is further configured to determine whether the command register contains an available slot, and fetch a command from the host computing device if the command register contains the available slot.

In one non-limiting embodiment, the controller is further configured to execute one non-vector command of the set of non-vector commands for each available slot in the command register.

In one non-limiting embodiment, the memory comprises an open-channel solid state drive (SSD) memory device.

In one non-limiting embodiment, a device is disclosed, wherein the device includes a memory and a controller communicatively coupled to the memory. In some configurations, the controller is configured to receive an indication that the memory has executed a non-vector command, wherein the non-vector command is one of a plurality of non-vector commands corresponding to a vector command received from a host computing device. In some configurations, the controller is configured to determine whether the memory has executed all of the plurality of non-vector commands corresponding to the vector command. In some configurations, the controller is configured to generate a completion message indicating execution of the vector command if the memory has executed each of the plurality of non-vector commands. And in some configurations, the controller is configured to transmit the completion message to the host computing device.

In one non-limiting embodiment, the controller is further configured to store the indication that the memory has executed the non-vector command if the memory has not executed all of the plurality of non-vector commands corresponding to the vector command.

In one non-limiting embodiment, the controller is further configured to receive a plurality of indications that the memory has executed a non-vector command, wherein each of the plurality of indications correspond to one of the plurality of non-vector commands. In some configurations, the controller is configured to store the plurality of indications. In some configurations, the controller is configured to clear the stored plurality of indications after transmission of the completion message to the host computing device.

In one non-limiting embodiment, each of the plurality of non-vector commands comprises one of a plurality of physical addresses contained in the vector command.

In one non-limiting embodiment, each of the physical addresses corresponds to a location in the memory.

In one non-limiting embodiment, each of the plurality of non-vector commands is configured to be executed in sequential order by the memory.

In one non-limiting embodiment, each of the plurality of non-vector commands shares at least one of a write, read, copy, or reset command with the vector command.

In one non-limiting embodiment, the memory comprises an open-channel non-volatile memory.

In one non-limiting embodiment, an apparatus is disclosed. In some configurations, the apparatus includes a means for receiving a vector command from a host device, wherein the vector command comprises a set of physical addresses. In some configurations, the apparatus includes a means for generating a set of non-vector commands, wherein each non-vector command in the set of non-vector commands corresponds to one of each physical address in the set of physical addresses, and wherein each non-vector command in the set of non-vector commands is configured to be executed by a means for storing digital data. In some configurations, the apparatus includes a means for generating a message to the host computing device indicating completion of the vector command in response to the execution of the set of non-vector commands by the means for storing digital data.

In one non-limiting embodiment, the apparatus includes a means for fetching meta-data from the host computing device, wherein the meta-data comprises a list of physical addresses, and wherein the vector command comprises a pointer configured to identify the set of physical addresses in the list of physical addresses in the meta-data.

In one non-limiting embodiment, the apparatus includes means for determining whether a command register contains an available slot, wherein the command register comprises a plurality of 1-bit slots. In some configurations, the apparatus includes a means for fetching a command from the host computing device if the command register contains the available slot.

While the foregoing is directed to embodiments of the present disclosure, other and further embodiments of the disclosure may be devised without departing from the basic scope thereof, and the scope thereof is determined by the claims that follow.

What is claimed is:

1. A device, comprising:
a memory; and
a controller communicatively coupled to the memory, wherein the controller is configured to:
fetch a command from a host computing device;
determine the fetched command is a vector command, wherein the determination is based on whether the fetched command comprises a field configured to communicate a list of scatter-gather logical block addresses;
identify a set of physical addresses in the vector command fetched from the host computing device, wherein each physical address of the set of physical addresses corresponds to a location in the memory;
generate a set of non-vector commands, wherein each non-vector command in the set of non-vector commands corresponds to one of each physical address in the set of physical addresses;
execute the set of non-vector commands; and
generate a message to the host computing device indicating completion of the vector command in response to the execution of the set of non-vector commands.

2. A device, comprising:
a memory; and
a controller communicatively coupled to the memory, wherein the controller is configured to:
fetch meta-data from a host computing device, wherein the meta-data comprises a list of physical addresses;
identify a set of physical addresses in a vector command fetched from a host computing device, wherein each physical address of the set of physical addresses corresponds to a location in the memory;

generate a set of non-vector commands, wherein each non-vector command in the set of non-vector commands corresponds to one of each physical address in the set of physical addresses;

execute the set of non-vector commands; and generate a message to the host computing device indicating completion of the vector command in response to the execution of the set of non-vector commands.

3. The device of claim 2, wherein the vector command comprises a pointer configured to identify the set of physical addresses in the list of physical addresses in the meta-data.

4. The device of claim 2, wherein the set of physical addresses comprises two or more physical addresses.

5. A device, comprising:

a memory;

a command register comprising a plurality of 1-bit slots; and a controller communicatively coupled to the memory and the command register, wherein the controller is configured to:

determine whether the command register comprises an available slot;

fetch a command from a host computing device if the command register comprises the available slot;

identify a set of physical addresses in a vector command fetched from a host computing device, wherein each physical address of the set of physical addresses corresponds to a location in the memory;

generate a set of non-vector commands, wherein each non-vector command in the set of non-vector commands corresponds to one of each physical address in the set of physical addresses;

execute the set of non-vector commands; and generate a message to the host computing device indicating completion of the vector command in response to the execution of the set of non-vector commands.

6. The device of claim 5, wherein the controller is further configured to execute one non-vector command of the set of non-vector commands for each available slot in the command register.

7. The device of claim 5, wherein the memory comprises an open-channel solid state drive (SSD) memory device.

8. The device of claim 1, wherein each non-vector command in the set of non-vector commands shares at least one of a write, read, copy, or reset command with the vector command.

9. A device, comprising:

a memory; and a controller communicatively coupled to the memory, wherein the controller is configured to:

receive an indication that the memory has executed a non-vector command, wherein the non-vector command is one of a plurality of non-vector commands corresponding to a vector command received from a host computing device;

determine whether the memory has executed all of the plurality of non-vector commands corresponding to the vector command;

store the indication that the memory has executed the non-vector command if the memory has not executed all of the plurality of non-vector commands corresponding to the vector command;

generate a completion message indicating execution of the vector command if the memory has executed each of the plurality of non-vector commands; and transmit the completion message to the host computing device.

10. A device, comprising:

a memory; and a controller communicatively coupled to the memory, wherein the controller is configured to:

receive an indication that the memory has executed a non-vector command, wherein the non-vector command is one of a plurality of non-vector commands corresponding to a vector command received from a host computing device;

receive a plurality of indications that the memory has executed a non-vector command, wherein each of the plurality of indications correspond to one of the plurality of non-vector commands;

store the plurality of indications;

determine whether the memory has executed all of the plurality of non-vector commands corresponding to the vector command;

generate a completion message indicating execution of the vector command if the memory has executed each of the plurality of non-vector commands;

transmit the completion message to the host computing device; and clear the stored plurality of indications after transmission of the completion message to the host computing device.

11. The device of claim 10, wherein each of the plurality of non-vector commands comprises one of a plurality of physical addresses contained in the vector command.

12. The device of claim 10, wherein the controller is further configured to hold a completion request until all requests in a vector command have been completed.

13. The device of claim 10, wherein each of the plurality of non-vector commands is configured to be executed in a sequential order by the memory.

14. The device of claim 9, wherein each of the plurality of non-vector commands shares at least one of a write, read, copy, or reset command with the vector command.

15. The device of claim 9, wherein the memory comprises an open-channel non-volatile memory.

16. An apparatus, comprising:

means for receiving a vector command from a host device, wherein the vector command comprises a set of physical addresses;

means for fetching meta-data from the host computing device, wherein the meta-data comprises a list of physical addresses, and wherein the vector command comprises a pointer configured to identify the set of physical addresses in the list of physical addresses in the meta-data;

means for generating a set of non-vector commands, wherein each non-vector command in the set of non-vector commands corresponds to one of each physical address in the set of physical addresses, and wherein each non-vector command in the set of non-vector commands is configured to be executed by a means for storing digital data; and means for generating a message to the host computing device indicating completion of the vector command in response to the execution of the set of non-vector commands by the means for storing digital data.

17. An apparatus, comprising:

means for determining whether a command register comprises an available slot, wherein the command register comprises a plurality of 1-bit slots;

means for fetching a command from the host computing device if the command register comprises the available slot;

means for receiving a vector command from a host device, wherein the vector command comprises a set of physical addresses;

means for generating a set of non-vector commands, wherein each non-vector command in the set of non-vector commands corresponds to one of each physical address in the set of physical addresses, and wherein each non-vector command in the set of non-vector commands is configured to be executed by a means for storing digital data; and means for generating a message to the host computing device indicating completion of the vector command in response to the execution of the set of non-vector commands by the means for storing digital data.

18. The device of claim 1, wherein the controller is further configured to:

determine which non-vector command of the set of non-vector commands has been executed; and aggregate the executed non-vector commands of the set of non-vector commands.

19. The device of claim 10, wherein each of the plurality of non-vector commands is configured to be generated based on at least one of an order of a physical address list, a structure of the device, and a resource availability.

20. The apparatus of claim 17, wherein the means for determining whether a command register comprises an available slot further comprises means for determining if a slot of the command register comprises a bit.

* * * * *